(No Model.)
A. G. JOHNSON.
FIFTH WHEEL FOR VEHICLES.
No. 324,116. Patented Aug. 11, 1885.
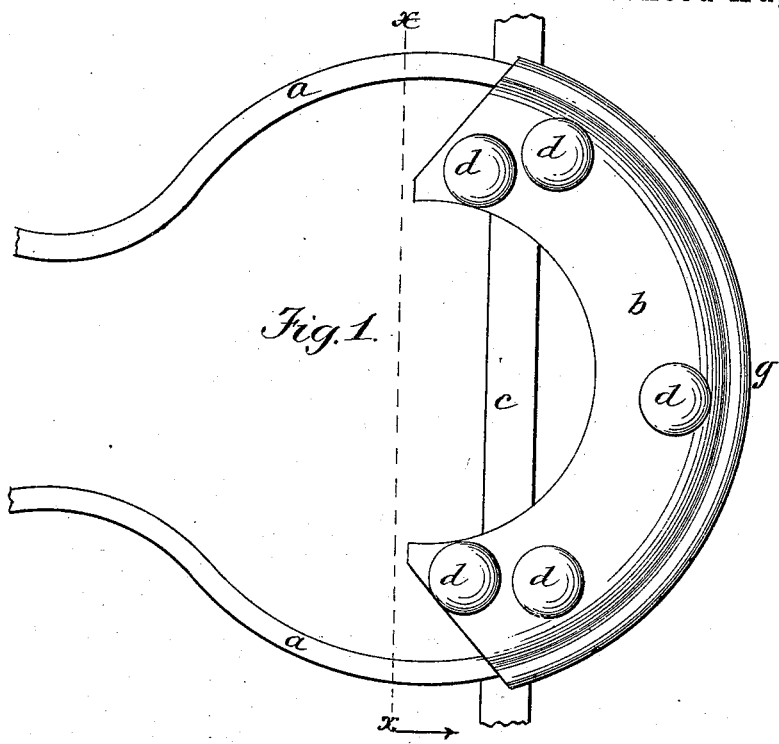
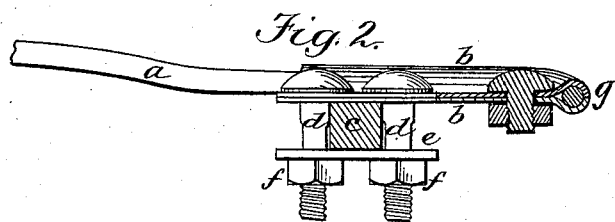
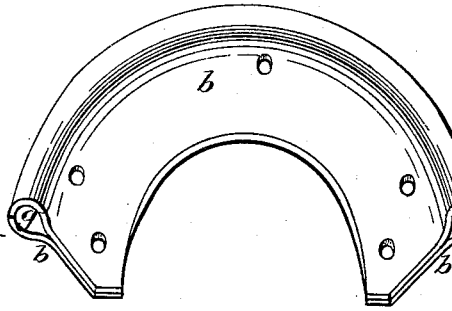
Witnesses:
R. E. Grant
G. E. Tucker
Inventor:
Allen G. Johnson,
by Johnson & Johnson
Att'ys

UNITED STATES PATENT OFFICE.

ALLEN GEORGE JOHNSON, OF QUITMAN, GEORGIA.

FIFTH-WHEEL FOR VEHICLES.

SPECIFICATION forming part of Letters Patent No. 324,116, dated August 11, 1885.

Application filed June 18, 1885. (No model.)

*To all whom it may concern:*

Be it known that I, ALLEN GEORGE JOHNSON, a citizen of the United States, residing at Quitman, in the county of Brooks and State of Georgia, have invented new and useful Improvements in Fifth-Wheels for Vehicles, of which the following is a specification.

In an application for a patent filed by me April 29, 1885, under Serial No. 163,821, I have described and claimed certain improvements in the running-gear of vehicles, embracing also a novel construction of fifth-wheel.

My present improvement is directed solely to an improved fifth-wheel consisting of matching plates forming a semicircular guideway for a curved reach, bolted together and clipped to the axle, so as to bring the semicircular guideway in front of the axle, forming a simple covered fifth-wheel, excluding the mud and sand from the grooved way.

The accompanying drawings represent, in Figure 1, a top view of my improved covered fifth-wheel device as it is clipped to the axle; Fig. 2, a vertical section of the same, and Fig. 3 the matching plates, which form the covered fifth-wheel guideway for the curved reach, and Fig. 4 a section on the line $x$ $x$, Fig. 1.

The reach $a$ is curved circularly at its front end, and extends to and is fastened to the rear axle in any suitable way. Two plates, $b$ $b$, of semicircular form at their outer edge, are made to meet in matching relation and to form a covered guideway, $g$, conforming to and receiving the curved reach. The matching plates are bolted together and to the axle $c$ by bolts $d$ and clip-ties, so as to bring the reach-guideway in front of the axle.

The fifth-wheel plates may be stamped out of sheet steel or of wrought-iron plates, or they may be cast, each part being formed with a groove along its outer edge, so that when joined they form a groove of circular form in cross-section to make the covered guideway for the reach. The ends only of the fifth-wheel plates lie upon the axle, and the bolts $d$ pass through the plates to clamp them together; and to secure them to the axle $a$ clip or tie-bar, $e$, is bound by the nuts $f$ to the under side of the axle, making a very durable and efficient fifth-wheel guideway at little expense and easily applied to the axle.

The fifth-wheel device formed of the matching plates can be used with any suitable mountings for the body.

The open ends of the semicircular guideway are flaring to allow play to prevent twisting the reach.

As the guideway is only open at its ends, it is practically covered and protected against filling with sand and mud. It serves as a reenforcement to the axle, and it serves the function of the king-bolt.

I claim—

1. The combination, with the axle and the curved reach, of the matching plates forming an inclosed semicircular guideway for the reach, secured together and to the axle, substantially as herein set forth.

2. The fifth-wheel plates having each a similar edge-curved conformation adapted to meet at their edges in forming a semicircular guideway for the reach, fastened at their ends to the axle by bolts and clip-ties, as described.

In testimony whereof I have hereunto set my hand in the presence of two subscribing witnesses.

ALLEN GEORGE JOHNSON.

Witnesses:
   G. M. CURTIS,
   F. L. JONES.